Patented Nov. 7, 1922.

1,434,740

UNITED STATES PATENT OFFICE.

ARTHUR HENRY GIBSON, OF BURSLEM, STOKE-ON-TRENT, ENGLAND.

TEAPOT, COFFEEPOT, AND LIKE ARTICLE PROVIDED WITH SPOUT.

Application filed April 1, 1922. Serial No. 548,820.

*To all whom it may concern:*

Be it known that I, ARTHUR HENRY GIBSON, subject of the King of Great Britain and Ireland, and resident of Burslem, Stoke-on-Trent, in the county of Stafford, England, earthenware manufacturer, have invented certain new and useful Improvements in Teapots, Coffeepots, and like Articles Provided with Spouts (for which I have filed application in Great Britain by application for Patent No. 173,128, dated the 1st day of November, 1920), of which the following is a specification.

My invention relates to improvements in teapots, coffee pots and the like articles provided with spouts, the object being to construct such articles so that the spouts and handles thereof are not easily broken or knocked off.

Figure 1:
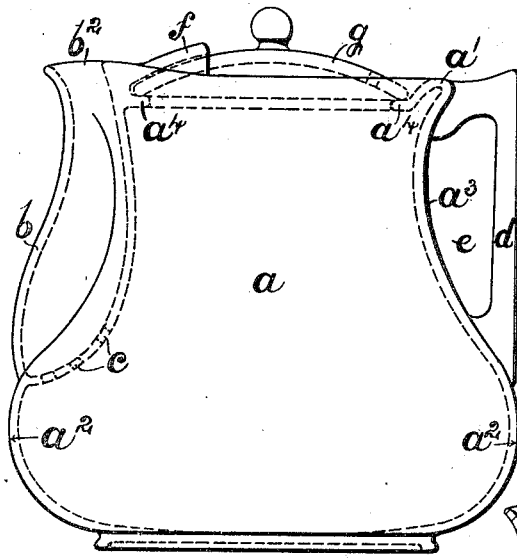
Figure 3:
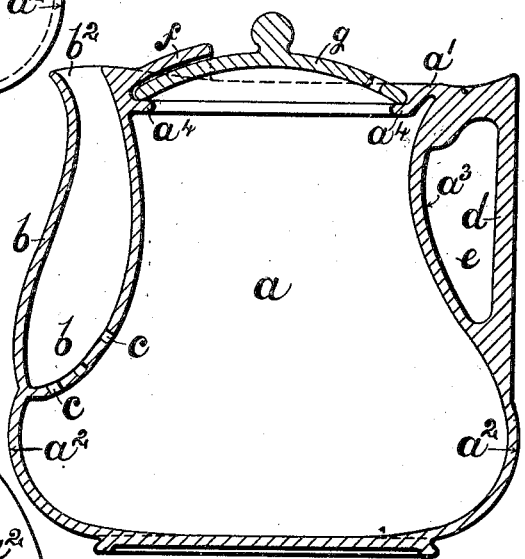
Figure 2:
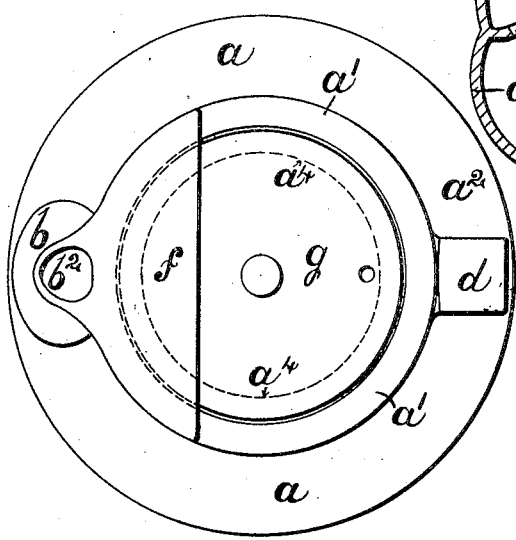

My invention will be fully described with reference to the accompanying drawings in which, Fig. 1 is an elevation illustrating a teapot constructed according to my said invention, Fig. 2 is a plan thereof, and Fig. 3 is a sectional elevation.

According to my said invention the body $a$ of the teapot is constructed with its upper portion $a^1$ and also the lower portion $a^2$ of greater diameter or size than the middle $a^3$ of the body $a$, the spout $b$ being arranged to extend from the widest portion $a^2$ and up the outside of the shaped or curved body $a$ so that no part of the spout $b$ projects further than the widest part $a^2$ of the body $a$ that is attached to it. The usual straining holes or perforations $c$ are formed through the teapot body $a$, just above the widest portion $a^2$ thereof, and into the spout $b$.

The handle $d$ of the teapot is also constructed on the outside of the body so that it does not project beyond the widest portion $a^2$ thereof, the shape or curvature of which provides sufficient space $e$ for the fingers to pass through when gripping the handle $d$.

The spout $b$ is preferably formed integral with the body $a$ during the process of manufacture but if desired it may be stuck in position against the body $a$ of the teapot as will be understood.

To prevent displacement of the lid during pouring an inward extension $f$ is employed for the lid $g$ to take under, the latter resting on the verge $a^4$. To remove the lid the part nearest the handle is first raised when it can be slid from underneath the extension $f$.

To apply the spout $b$ to the outside of a metal teapot it is constructed to the curvature or shape of the teapot above the widest part thereof and afterwards soldered or fixed thereto. The handle $d$ may also be constructed of metal and fixed to the outside of the metal body but my invention is more particularly applicable to teapots constructed of pottery.

By employing a spout $b$ extending above the lower portion $a^2$ which is of greater diameter or width than the middle portion $a^3$ of the body $a$ and with the outlet $b^2$ of the spout terminating at or near the upper broad portion $a^1$ of the body $a$, the spout $b$ cannot be readily broken whilst the tea or other liquid therein can be easily poured in the ordinary way.

What I claim as my invention and desire to secure by Letters Patent is:—

1. A teapot, coffee pot or pouring vessel having a body constructed with its upper and lower portions of greater diameter than the middle thereof and with the spout extending from above the widest lower portion and up the outside of the curved body so as not to project beyond the lower widest part thereof substantially as and for the purpose described.

2. A teapot, coffee pot or pouring vessel having a body constructed with its upper and lower portions of greater diameter than the middle thereof, and having also a handle formed on the outside of the curved body or vessel, said handle being connected above the widest lower portion of the teapot and at or near the top thereof so as not to project beyond the widest lower portion substantially as and for the purpose described.

In testimony whereof I have hereunto set my hand in the presence of two witnesses.

ARTHUR HENRY GIBSON.

Witnesses:
J BENTON,
J. H. COPESTAKE.